United States Patent
Angelin et al.

(10) Patent No.: US 9,099,920 B2
(45) Date of Patent: Aug. 4, 2015

(54) CONVERTER DEVICE

(71) Applicant: Osram GmbH, Munich (DE)

(72) Inventors: Francesco Angelin, Mogliano Veneto (IT); Paolo De Anna, Riese Pio X (IT)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 14/367,946

(22) PCT Filed: Dec. 17, 2012

(86) PCT No.: PCT/IB2012/057391
§ 371 (c)(1),
(2) Date: Jun. 23, 2014

(87) PCT Pub. No.: WO2013/098706
PCT Pub. Date: Jul. 4, 2013

(65) Prior Publication Data
US 2015/0002051 A1 Jan. 1, 2015

(30) Foreign Application Priority Data

Dec. 28, 2011 (IT) .................................. TO11A1222

(51) Int. Cl.
*H05B 33/08* (2006.01)
*H02M 3/156* (2006.01)

(52) U.S. Cl.
CPC ........... *H02M 3/156* (2013.01); *H05B 33/0815* (2013.01)

(58) Field of Classification Search
CPC .... H02M 3/156; H02M 3/06; H05B 33/0815; H03K 17/063

USPC ............. 315/209 R, 127, 224, 291, 310, 311; 323/283

See application file for complete search history.

(56) References Cited

U.S. PATENT DOCUMENTS

| | | | | |
|---|---|---|---|---|
| 8,558,470 B2 * | 10/2013 | Shteynberg et al. | .......... | 315/224 |
| 8,674,614 B2 * | 3/2014 | Angelin et al. | .......... | 315/209 R |
| 8,698,421 B2 * | 4/2014 | Ludorf | .......... | 315/307 |
| 8,860,386 B2 * | 10/2014 | Angelin | .......... | 323/225 |
| 2005/0225259 A1 | 10/2005 | Green | | |
| 2012/0139423 A1 | 6/2012 | Angelin et al. | | |

FOREIGN PATENT DOCUMENTS

WO 2011029194 A1 3/2011

OTHER PUBLICATIONS

International Search Report issued in the corresponding PCT application No. PCT/IB2012/057391, dated May 7, 2013.

* cited by examiner

*Primary Examiner* — Vibol Tan

(57) ABSTRACT

A converter, for feeding a load via an inductor, includes a switch to permit or prevent the feeding of current towards inductor, and a current sensor with a resistor coupled to the converter output, adapted to sense the current through said inductor when switch is off. A further switch is provided which is conductive when said switch is turned off; moreover, a drive circuitry is provided which is coupled to current sensor to turn said switch on as a function of the detected current. Drive circuitry is fed by a bootstrap circuit which includes: a bootstrap capacitor to accumulate a feeding charge for drive circuitry and coupled to the converter output and to a bootstrap diode, a coupling capacitor interposed between said further switch and bootstrap diode, as well as a bootstrap resistor interposed between a power supply source and bootstrap diode to charge coupling capacitor therefrom.

12 Claims, 4 Drawing Sheets

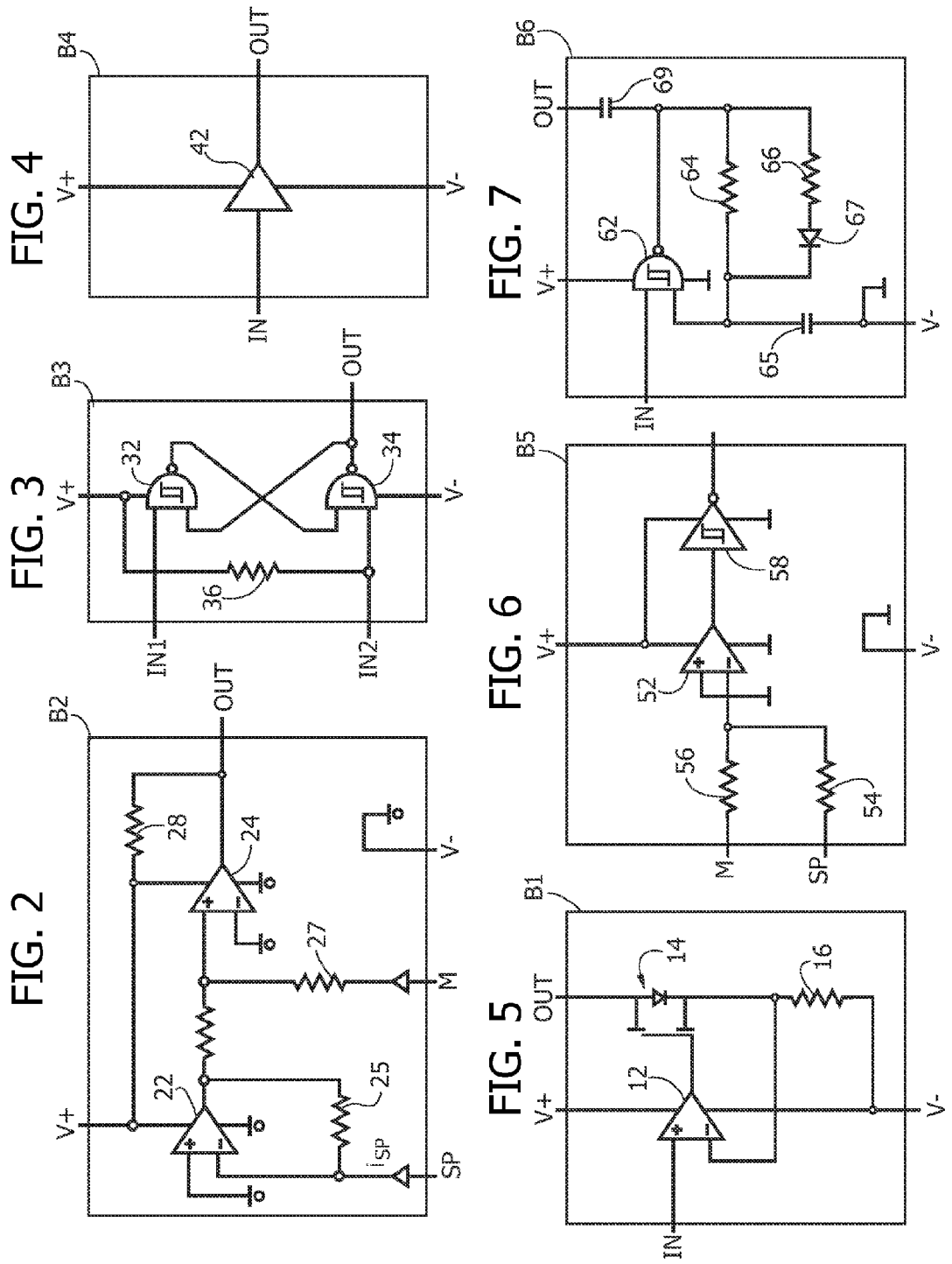

CONVERTER DEVICE

RELATED APPLICATIONS

The present application is a national stage entry according to 35 U.S.C. §371 of PCT application No.: PCT/IB2012/057391 filed on Dec. 17, 2012, which claims priority from Italian application No.: TO2011A001222 filed on Dec. 28, 2011, and is incorporated herein by reference in its entirety.

TECHNICAL FIELD

Various embodiments relate to converters, for example for supplying loads such as light sources, e.g. LED light sources.

BACKGROUND

The Italian Patent Application n. TO2010A000961 describes a converter which may be used to drive a load comprising for example one or several LED light sources.

Such a solution allows for the implementation of switching converters, for example of a non-isolated type, specifically in the form of a generator of "constant" current (in the terms which will be outlined in better detail in the following, i.e. an average constant current, which oscillates and is always included within two limit values, so that the average value in time is constant) with a very high voltage dynamic, i.e. wherein the output current of the DC/DC converter delivered to the load remains stable in spite of large and rapid variations of the load voltage, so that the converter is an almost ideal current generator.

Such a converter may be employed in association with lighting sources, for example LED lighting sources.

SUMMARY

The inventors were able to remark that the previously considered solution may be further improved as regards at least one of the following aspects;
- preventing, in some embodiments, possible delays in signal propagation to affect the possibility of regulating the current precisely and with reduced ripple, irrespective of the values of input and output voltages and of current; and/or
- preventing, in some embodiments, the beginning stage of freewheeling (i.e. the time at which the main switch opens) from being altered, which likewise affects the possibility of regulating current precisely and with reduced ripple.

The object of the present disclosure is to propose an improved solution as regards at least one of the previously outlined needs.

In various embodiments, such an object is achieved through a device having the features specifically set forth in the claims that follow. Various embodiments also concern a related method. Various embodiments allow for the provision of an improved solution of both previously outlined issues.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIGS. 2 to 8 show the structure of some blocks of embodiments,

DETAILED DESCRIPTION

In the following description, numerous specific details are given to provide a thorough understanding of embodiments. The embodiments may be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
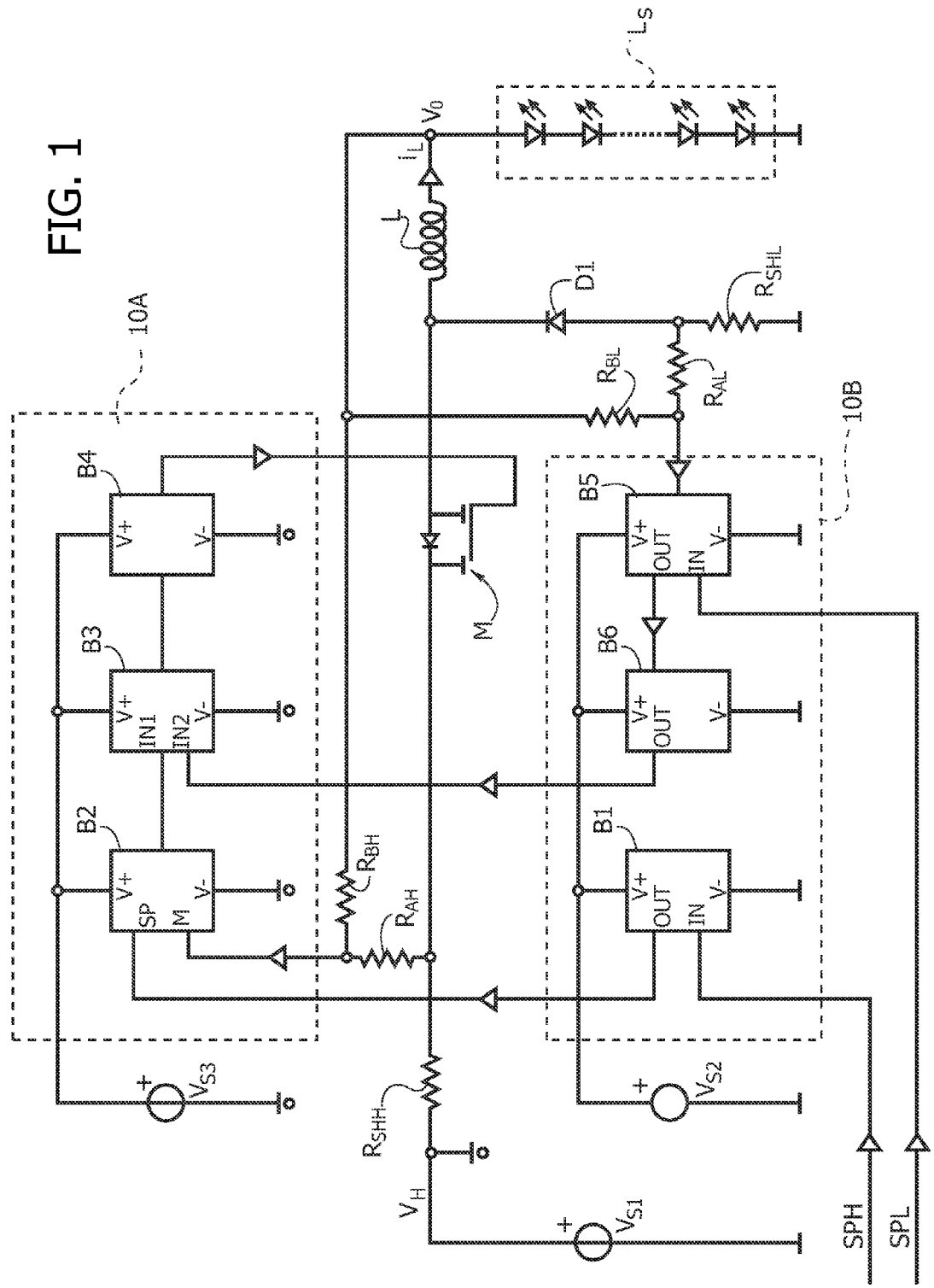
FIG. 1 is a block diagram of embodiments.

In the diagram of FIG. 1, which basically corresponds to the diagram of FIG. 6 of previously mentioned Application TO2010A000961, reference 10 denotes on the whole a converter adapted to drive, in various embodiments, a load $L_S$ comprised for example of one or several LED light sources.

In various embodiments, load $L_S$ may be comprised of one or several LED strings.

Supply starts from a source that, in various embodiments, is configurable as a voltage source $V_{S1}$, connected to load $L_S$ via a switch M and a filter, comprised of an inductor. In various embodiments, switch M may be an electronic switch, for example a mosfet. In various embodiments, switch M may be an N-type mosfet.

In the embodiments referred to in the diagram of FIG. 1, connection between source $V_{S1}$ and switch M goes through a resistor $R_{SHH}$, and connection between switch M and load $L_S$ goes through an inductor L.

In the presently considered and merely exemplary embodiments, a diode D1 is connected with its cathode interposed between switch M and inductor L, and with its anode connected to a further resistor $R_{SHL}$, whose end opposed to diode D1 is connected to ground.

References SPH and SPL denote, as will be more fully explained in the following, two reference signals which are adapted to define the high-set-point and the low-set-point of the possible variation range of current $i_L$ in inductor L and in load $L_S$.

In various embodiments, the diagram in FIG. 1 exemplifies therefore a converter enabling the supply a load $L_S$, via an inductor L, with a current $i_L$ of controlled intensity, included between a maximum and a minimum level identified by signals SPH and SPL.

Switch M is selectively switcheable, in order to permit or prevent, respectively, the power supply from source $V_{S1}$ towards inductor L.

Shunt resistor $R_{SHH}$ is a first current sensor, which detects the current flowing through switch M when that switch is on (i.e. conductive).

Shunt resistor $R_{SHL}$ is a second current sensor, which detects the current flowing towards load $L_S$ through inductor L when switch M is off (i.e., non conductive), and diode D1 is closed to recirculate the current in inductor L (so-called freewheeling stage).

References $V_{S2}$ and $V_{S3}$ denote two auxiliary generators, the function whereof will be more clearly defined in the following. Generators $V_{S2}$ and $V_{S3}$ may be designed according to criteria known in the art, so that they do not require a detailed description herein.

In various embodiments, within converter 10 it is possible to discern two sections, that is a high side or section 10A, and a low side or section 10B.

The high side or section 10A is tied to line $V_H$, that connects source $V_{S1}$ to load $L_S$ (that is, in practice, the common return for all circuits on the high side 10A), and is provided with its own power supply $V_{S3}$. The high side or section 10A is adapted to sense current $i_L$ that flows through switch M (i.e. through load $L_S$) when switch M itself is closed ("on"). This takes place through cooperation with shunt resistor $R_{SHH}$ which, in the presently considered embodiment, is connected in series with the N-type mosfet drain, of which switch M is comprised. The high side or section 10A comprises three blocks, denoted by B2, B3 and B4.

The low side or section 10B is on the contrary tied to the common ground (i.e. the load return) and to references SPH and SPL, with its own power supply $V_{S2}$. The low side or section 10B is adapted to sense current $i_L$ flowing through inductor L (i.e. through load $L_S$) when switch M is open ("off") and diode D1 is closed, i.e. conductive. This takes place through the second shunt resistor $R_{SHL}$. The low side or section 10B comprises three blocks B1, B5 and B6.

In various embodiments, the plural blocks B1 to B6 may be defined, as for the function they perform, as follows:
B1: level shifter,
B2: high side comparator,
B3: main control logic,
B4: driving unit of switch M (of the mosfet gate, in the presently considered example),
B5: low side comparator, and
B6: pulse former and level shifter.

Possible embodiments of each block B1 to B6 are described in detail in Application TO2010A000961, repeatedly mentioned in the foregoing.

As already stated in such an application, various aspects of the functions and/or the processing circuits described in the prior application are in no way compulsory for the implementation of embodiments: on the contrary, the reference to such general designations highlights the fact that functions similar or equivalent to those performed by the blocks described in detail in Application TO2010A000961 may be performed through different circuit arrangements; this is true for example for block B4, for which the prior application already exemplifies different possible embodiments.

The inventors have remarked that in some embodiments of a circuit according to the general arrangement of FIG. 1, possible propagation delays may occur which may affect the possibility to regulate the current precisely and with reduced ripple, and irrespective of the values of input and output voltages ($V_H$ and $V_O$) and of the current.

Moreover, the inventors have remarked that in some embodiments undesirable phenomena may occur which may distort the measurement of current in the beginning stage of freewheeling, with the consequent risk of closing main switch M of the converter (making it conductive) excessively early.

Starting from block B1, a comparative examination of FIGS. 1 and 5 shows that input IN of that block comprises the high reference signal SPH that undergoes, in the presently considered exemplary embodiment, a simple voltage-to-current conversion, via an operational amplifier 12. Amplifier 12 receives signal SPH at its non inverting input, and drives a mosfet 14 adapted to generate an output current signal OUT, sent towards block B2 (refer to FIG. 1), for example with a resistor 16 determining the relationship between input voltage IN and output current OUT.

Block B2 (referring jointly to FIGS. 1 and 2) receives at the input denoted as SP (set point) the reference value corresponding to level SPH, converted into current by block B1, and processes it on the basis of a measurement signal M which represents the value of current $i_L$ (this value may be inferred for example on the basis of the voltage drop across shunt resistor $R_{SHH}$), offset via a signal divider, for example a resistive one, $R_{AH}$, $R_{BH}$ for reasons which will be better detailed in the following.

The output signal from block B2, denoted OUT, is essentially a logic level, adapted to signal that current $i_L$ in the load has reached the upper level identified by level SPH. In practice, when the current in the load is about to reach the (upper) level SPH, block B2 may supply a corresponding signal IN1 to logic block B3, which will be better detailed in the following.

In the presently considered and merely exemplary embodiment, block B2 is essentially comprised of an operational amplifier 22, and serves as a set-point recovery circuit by working substantially as a current/voltage converter. In the presently considered embodiment, moreover, there is also provided a comparator 24, that senses the output of amplifier 22 and asserts a given logic level ("low", in the presently considered example) when the load current is about to reach the level identified by SPH.

References 25, 26, 27 and 28 denote the resistors associated to the previously described components 22 and 24, in order to perform said function. The connection criteria of such resistors are well known in themselves and may be chosen on the basis of the desired purpose, and therefore they do not require a detailed description herein.

Before describing possible embodiments of blocks B3 and B4, for simplicity an embodiment of block B5 is to be described which is adapted to perform, on the low side, a function corresponding to the one performed by block B2 on the high side.

Therefore, block B5 receives, at input SP (see jointly FIGS. 1 and 6), the reference signal or low set point identified by SPL.

Input M to block B5 is simply a signal representing load current $i_L$, measured on the low side, for example by sensing the voltage drop across shunt resistor $R_{SHL}$, and by subjecting the related voltage value to an offset via a divider, for example a resistive divider, $R_{AL}$, $R_{BL}$ for reasons which will be better detailed in the following.

Output OUT from block B5, adapted to be issued towards block B6, is a logic signal adapted to signal, to logic block B3 (through block B6, in the presently considered example), the fact that the current is about to reach the lower threshold level, identified by SPL.

In the presently considered example, block B5 comprises a comparator 52, having its non-inverting input connected to ground, and the inverting input whereof serving as a summing point adapted to receive, respectively through a resistor 54 and through a resistor 56, the signal at input SP (i.e. the lower threshold level, identified by SPL), and a signal stating the measured current (signal M, generated from shunt resistor $R_{SHL}$). In the presently considered embodiment, the output of comparator 52 is connected to a logic inverter 58, adapted to generate the output signal of block B5, denoted by OUT.

This signal is brought to the input of block B6 (see FIGS. 1 and 7 jointly), the function whereof is to receive the logic level coming from the comparator on the low side B5, in order to generate a signal 1N2 for logic block B3, which is compatible with this logic block being on the high side of converter 10. In the presently considered example, block B6 substantially corresponds, for the presence of element 69 which will be described in the following, to a derivative network with a start-up circuit, made up by a retriggerable astable oscillator.

Specifically, reference 62 denotes a logic gate NAND which receives at one input IN the output signal from block B5, and at the other input the signal of a feedback network substantially similar to an RC circuit (resistor 64 and capacitor 65), wherein resistor 64 is connected in parallel with a series connection of a resistor 66 and a diode 67, the cathode being turned towards capacitor 65 and gate 62. Moreover, the gate output 62 is connected to the respective output, which is sent to block B3 through a capacitor 69.

The circuit operates by generating an output pulse OUT every time one of them arrives at input IN, or when a certain time elapses from the arrival thereof or from the last one having been sent to the output, so as to enable the start or a new start of the cyclic operation (see below).

Referring now to logic block B3, in the presently considered and merely exemplary embodiment it is a logic latch circuit with active-low inputs.

In the presently considered, merely exemplary and non-limiting embodiment, it is essentially a bistable logic circuit (see FIG. 3), built around two logic gates NAND 32, 34, each of which receives, at an input, one of the signals IN1 and IN2 respectively coming from the high-side comparator B2 and from the low-side current comparator B5 (through block B6) and, at the other input, the output of the corresponding gate (i.e., the output of gate 34 for gate 32, and the output of gate 32 for gate 34). Reference 36 denotes a biasing resistor.

The diagram in the Figure refers for simplicity of representation to an embodiment wherein an output of block B3 (in the presently considered embodiment, output 34) may be used to drive switch M through block B4, together with the logic function of closing the switch when a signal arrives from B6, and to open it again when it arrives from B2.

By considering what has previously been stated, the logic signals IN1 and 1N2 supplied to block B3 from blocks B2 and B5 indicate that the current level is about to reach one of the limits of the possible variation range, i.e.:
the upper limit level, identified by signal SHP-block B2, or else
the lower limit level, identified by signal SPL-block B5.
For example, referring to the implemented operation:
when the current is about to reach the level of high set-point (SPH), the output of block B3 goes to a level corresponding to turning off or opening switch M, so as to interrupt the current flowing towards inductor L, and
when the current is about to reach the level of low set-point (SPL), the output of block B3 goes to a level corresponding to turning on or closing switch M, so as to re-establish the flow of current towards inductor L.

In various embodiments, block B3 may also perform other functions, for example an enable/disable function, system start-up management, auxiliary protection. In various embodiment, a part of the functions of assembly 10A or of its single components B2, B3 or B4 may in case be shared with block B6, or transferred to such a block, so as to have a common ground for auxiliary signals.

Block B4 has essentially the function of driving switch M. For example, if switch M is a mosfet, for example an N-type mosfet, block B4 may convert the logical level generated at output OUT of block B3 into an actual drive signal for the mosfet gate. This may involve for instance the functions of level shifting and/or current or voltage amplification, so as to ensure the driving of switch M in the desired conditions. In one possible embodiment, as shown in FIG. 4, circuit B4 may be comprised of a simple buffer/amplifier 42, which can be supplied for example by high-side source $V_{S3}$, at least in static conditions or during circuit start-up.

Figure 8:
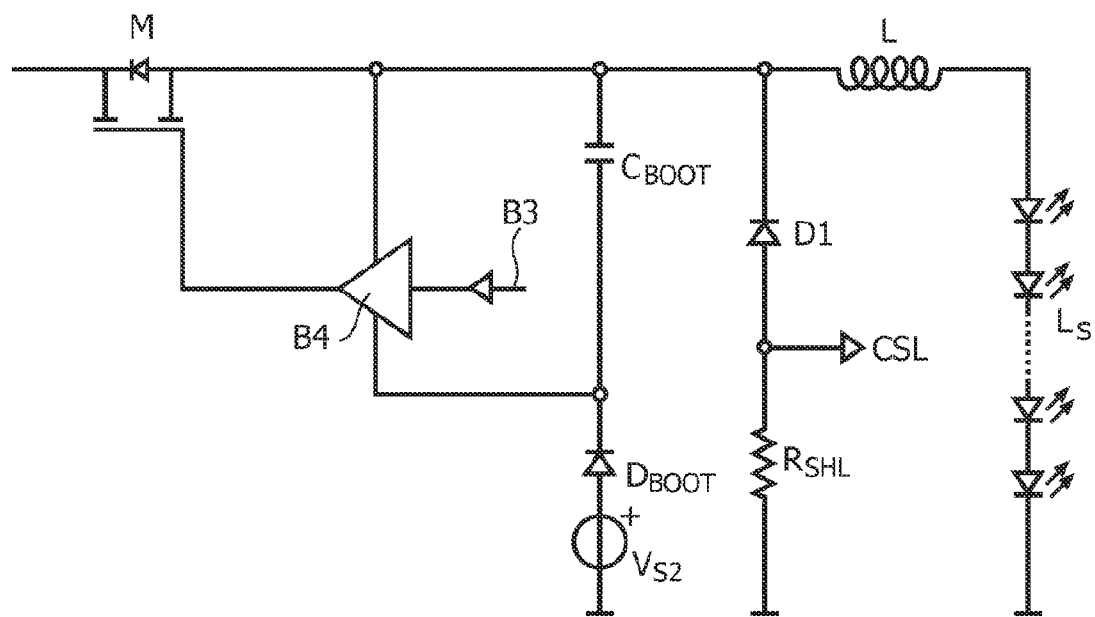

As a synthesis of what has been detailed with reference to FIGS. 4 and 13 of Application TO2010A000961, which has been repeatedly mentioned in the foregoing, FIG. 8 shows possible implementations, in various embodiments, of the supply of switch M, ensuring driving of switch M, starting from block B3, specifically in view of the possibility of supplying block B4 not from $V_{S3}$, but indirectly form $V_{S2}$.

FIG. 8 shows, by way of example, a bootstrap circuit adapted to obtain a supply voltage for the driver of switch (mosfet) M, which in this case is exemplified by block B4.

Said bootstrap circuit may be comprised of a capacitor $C_{BOOT}$ and a diode $D_{BOOT}$, connected to the lower auxiliary supply $V_{S2}$, and adapted to supply the buffer when the mosfet is switching.

In the presently considered example, capacitor $C_{BOOT}$ is connected (in the same way as supply V+V− of block B4) between:
a position interposed between switch M and inductor L, i.e. wherein the source of switch M (the cathode of diode D1) is connected;
the cathode of diode $D_{BOOT}$, the anode whereof is connected to voltage $V_{S2}$, referred to ground.

Application TO2010A000961 also describes means allowing for the generation of an analogue signal which expresses the value of the average current to the load, by adding the average values of the current derived from each shunt ($R_{SHH}$ and $R_{SHL}$). The operation of such means is based on the fact that the integer of the sum of currents (that is the current supplied to the load) corresponds to the sum of the integers of the single obtained components.

FIGS. 9 to 12 are chronograms referring to a common time scale, and which represent the "on" and respectively the "off" state of switch M on the basis of the current behavior on load $i_L$ (FIG. 9), which varies around an average value included between a maximum and a minimum level, indicated by levels SPH and SPL.

Figure 10:
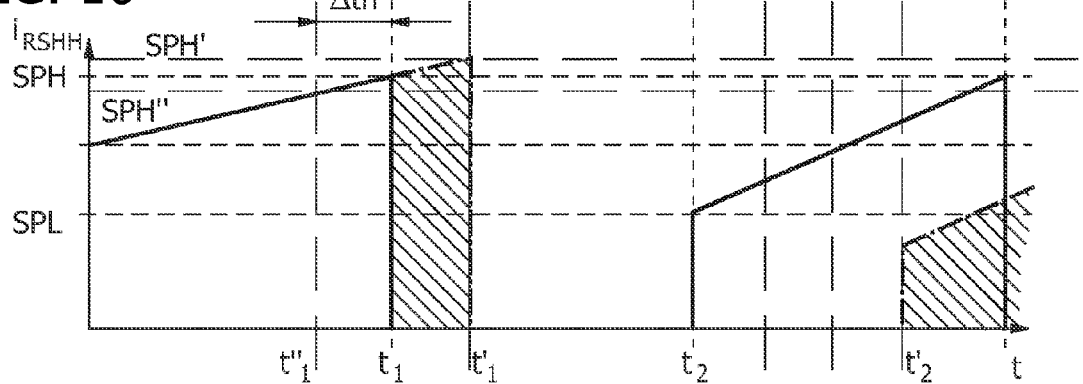
Figure 11:
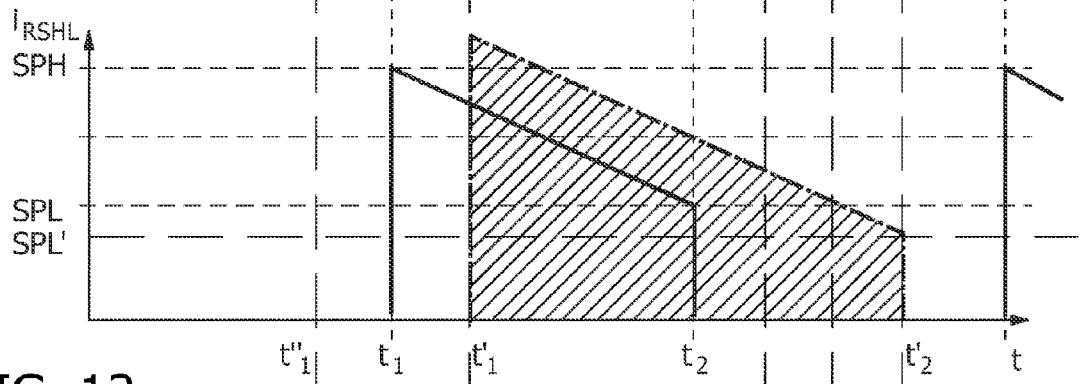

The diagrams in FIGS. 10 and 11 indicate the corresponding behavior of the current through high-side shunt resistors $R_{SHH}$ (FIG. 10) and low-side shunt resistor $R_{SHL}$ (FIG. 11).

Figure 12:
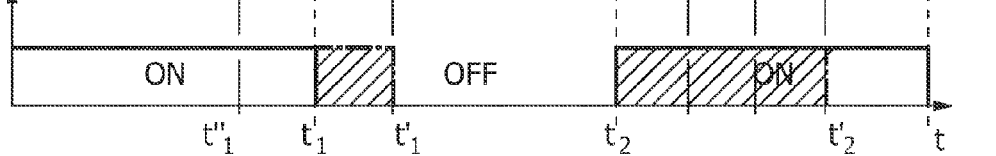

The diagram in FIG. 12 shows on the contrary the "on" state and the "off" state of switch M.

Figure 9:
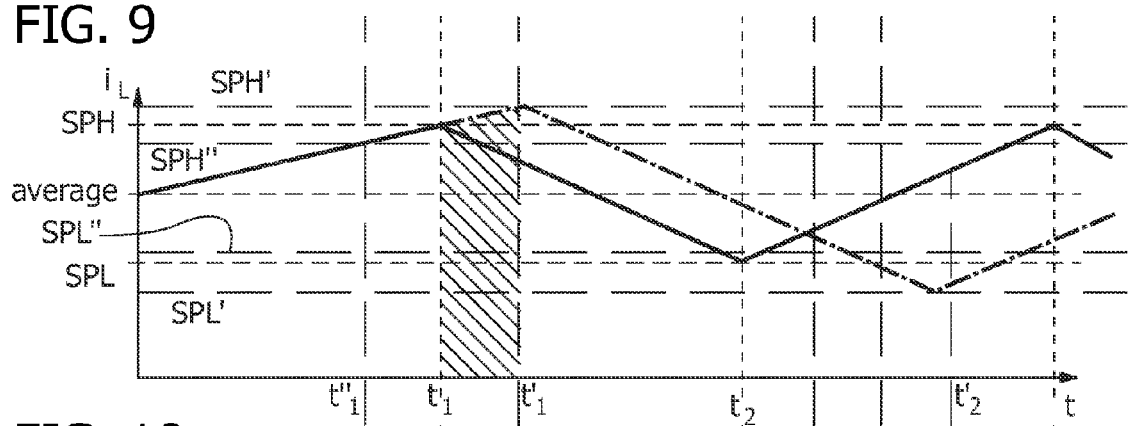
FIGS. 9 to 12 show the behaviour of a certain signals during operation of an embodiment, highlighting the operation criteria of various embodiments.

FIGS. 9 to 12 refer to a steady state with a constant output voltage which is lower than the input voltage, and assuming to analyze the circuit operation starting from an initial state wherein switch M is closed, i.e. conductive. In these conditions, the current flowing towards load $L_S$ through inductor L grows in a corresponding way, which is mirrored by the voltage detectable across shunt resistor $R_{SHH}$ (FIG. 9).

The current will have reached the maximum level identified by signal SPH at time t1 and, assuming ideal operating conditions, this event will be detected by block B2 acting on block B3 (signal IN1), so that the latter opens switch M through block B4.

In these conditions (i.e. when switch M opens) the current in the drain network (and therefore also the current through shunt resistor $R_{SHH}$) drops to zero, while diode D1, which acts as a freewheeling diode, starts conducting, so that the low-side shunt resistor $R_{SHL}$, is traversed by the same current $i_L$ which flows in load LS through inductor L (freewheeling stage).

At this point, the output current starts dropping, until it has reached the lower level identified by signal SPL at time t2; this event, always assuming ideal operating conditions, may be identified by block B5 acting on block B3 (signal IN2), so that the latter, likewise through block B4, activates switch M again. As a consequence, the current across low-side shunt resistor $R_{SHL}$ drops to zero and diode D1 opens.

At this point, the cycle starts again, and the current across inductor L starts growing again.

If the output current does not reach the high level, identified by level SPL, in various embodiments switch M may be driven so as to stay active for an indefinite time.

Tests performed by the inventors have shown that, in some embodiments, for example depending on the employed components and/or if circuits arrangements are used which are different from the exemplified ones, converter 10 may experience a signal propagation delay which might, at least in some cases, affect the regulating action of the regulated current.

Various embodiments allow for a mitigation and virtually for the elimination of the effects of such delays, so that the regulating action of the current may take place according to the model shown with a continuous line diagram in FIG. 9.

The dash-and-dot diagrams in FIGS. 9 to 12 show (in an exaggerated representation to ease understanding) the possible effects of the delays which have been previously mentioned. It will moreover be appreciated that, in order not to overburden the graphical representation, in the diagrams and particularly in FIG. 9 the possible values of current $i_L$ denoted in the following $I_{SPH}$, $I_{SPL}$, etc. are simply denoted by the related suffixes SPH, SPL, etc.

In the following, an analytical description of the phenomenon will be provided, in the usual simplified cases wherein inductance L and input and output voltages $V_H$ and $V_O$ are constant and known.

As regards the rising slope of the current (see for example the extreme left part of the diagram in FIG. 9), i.e. when switch (e.g. mosfet) M is closed, and assuming to start from time $t_0$ wherein current $i_L$ in inductor L has a minimum value amounting to $I_{SPL}$, the following state $i_L = I_{SPH}$ is reached at time $t_1$:

$$t_1 - t_0 = \frac{I_{SPH} - I_{SPL}}{V_H - V_O} \cdot L$$

At this point block B2 operates, consequently mosfet M is deactivated and the falling slope of the current sets in.

The circuit action may however require a certain time, introducing therefore a delay such that the actual opening of mosfet M takes place at time $t_1'$ (subsequent to $t_1$), current having meanwhile reached level $I_{SPH'}$, exceeding the set value $I_{SPH}$, and having therefore an error on the high value (positive peak).

The amount of such an error is:

$$I_{SPH'} - I_{SPH} = \Delta I_H = \Delta t_H \cdot \frac{V_H - V_O}{L} = (t_1' - t_1) \cdot \frac{V_H - V_O}{L}$$

wherein $\Delta t_H$ is the propagation delay for the signal chain (essentially of block 10A, in the presently considered example) of the current, and $\Delta I_H$ is the error on the high (maximum) peak of the current.

In various embodiments, this possible drawback may be avoided by anticipating the command of turning off switch M, so that the corresponding effect is achieved exactly at the desired time ($t_1$), and therefore at the desired peak current $I_{SPH}$.

Depending on the analytical relations which have been previously stated, such a result may be obtained, according to presently considered embodiments, by acting on terminal SP of block B2, i.e. by modifying the trigger threshold value of the same.

In various embodiments, the desired compensation effect is achieved by having switch M turned off for a value of current $i_L$ equal to $I_{SPH''}$, corresponding to a "compensated" value of the desired peak current $I_{SPH}$, so that the following relation is true:

$$I_{SPH''} = I_{SPH} - \Delta I_H = I_{SPH} - \Delta t_H \cdot \frac{V_H - V_O}{L} = I_{SPH} - \gamma_H \cdot (V_H - V_O)$$

with $\gamma_H = \Delta t_H / L$, wherein $I_{SPM''}$ is the new trigger threshold; $\gamma$ is a constant with the size of a conductance ($\Omega^{-1}$).

In practice, as current $i_L$, is "read" via a shunt $R_{SHH}$ which outputs a proportional voltage thereof, the corresponding voltage signal amounts to:

$$V_{SPH''} = I_{SPH''} \cdot R_{SHH} = V_{SPH} - k_H \cdot (V_H - V_O), \text{ with}$$
$$k_H = \gamma_H \cdot R_{SHH}$$

wherefrom it is derived that the new set point voltage $V_{SPH''}$ equals the originally desired voltage $V_{SPH}$ (ideal value), less a part of the difference between input and output voltage (actually, $k_H$ is now a dimensionless constant).

In various embodiments, in the particular topology proposed which has high-side shunt $R_{SHH}$ connected on one side to the input voltage, it is easy to implement compensation as analytically proposed.

In various embodiments, a resistive divider may be provided implementing the ratio $k_H$, and it is possible to apply a correction to the measurement terminal (M of block B2, in the embodiment of FIG. 1), taking into due consideration the signs of the same voltages. To this respect it will be appreciated that the compensation may be small in comparison with the measurement signal.

In various embodiments, as exemplified in FIG. 1, the divider may be comprised of two resistors $R_{AH}$ (interposed between shunt resistor $R_{SHH}$ and the measurement input M of block B2) and $R_{BH}$ (interposed between measurement input M of block B2 and the output of converter 10, i.e. load $L_S$), so that:

$k_H \approx R_{AH}/R_{BH}$, in the approximation wherein
$R_{BH} >> R_{AH} >> R_{SHH}$.

In various embodiments, said compensation mechanism may therefore be implemented by applying a compensation "offset" to the signal itself; this offset is determined on the basis of voltage $V_H - V_O$. This in any case does not cause a significant reduction of the current signal, which is used for comparative purposes ($R_{BM} >> R_{AH}$, with possible ratios of the order of 10000:1).

Of course, in addition to the previously stated analytical approach, the amount of such a compensating action (e.g. a modification of the comparison threshold between inputs M and SP of block B2, for example for a share of the difference between input voltage and output voltage) may be determined experimentally.

In any case, the result which may be achieved in various embodiments consists in obtaining the turning off of switch (mosfet) M exactly at the desired time $t_1$ and at the required peak current $I_{SPH}$.

Corresponding remarks may be made for low threshold $I_{SPL}$, with reference (see specifically the same dash-and-dot diagram of FIG. 9) to the falling slope of the current, starting from value $I_{SPH}$ to reach value $I_{SPL}$.

In this case, the possible risk consists in signal propagation delays within converter 10 causing mosfet M to turn on "belatedly" with respect to the awaited time $t_2$, with the obvious consequence of having a real minimum peak current which is lower than the predetermined value.

Assuming that, starting from time $t_1$ when the mosfet is turned off, the subsequent state $i_L = I_{SPL}$ is reached at $t_2'$:

$$t_2 - t_1 = \frac{I_{SPH} - I_{SPL}}{V_O} \cdot L$$

(it will be appreciated that a correspondence is present with what has previously been stated for the high part of the signal); the error is therefore as follows:

$$|\Delta I_L| = \Delta t_L \cdot \frac{V_O}{L} = (t_2' - t_2) \cdot \frac{V_O}{L}$$

wherein $\Delta t_L$ may be for example the propagation delay for the signal chain through low portion 10B and/or blocks B3 and B4.

Value $\Delta I_L$ is the error on the low peak (minimum) of the current, and is to be understood in an absolute sense (the real sign is negative, because value $I_{SPL'}$ is lower than value $I_{SPL}$ (see the same dash-and-dot diagram of FIG. 9).

Therefore, as has already been done for the high part, a new "compensated" value $V_{SPL''}$ may be calculated, which will be brought to the measurement input M of block B5 as:

$$V_{SPL''} = I_{SPL''} \cdot R_{SHL} = V_{SPL} + k_L \cdot V_O,$$

with $k_L = \gamma_L \cdot R_{SHL} = \frac{\Delta t_L}{L} \cdot R_{SHL}$

In this case as well, the outlined drawback may be avoided by anticipating the command of turning on switch M, so that the related effect may be achieved exactly at the desired time ($t_2$) and therefore at the desired peak current $I_{SPL}$.

Referring to the analytical relations previously stated such a result may be obtained, according to presently considered embodiments, by acting on terminal IN of block B5, i.e. by modifying the value of the intervention threshold of the same.

In various embodiments, such a result may be achieved by adding a second resistive divider.

In various embodiments, as exemplified in FIG. 1, the divider may be comprised of two resistors $R_{AL}$ (interposed between shunt resistor $R_{SHL}$ and measurement input M of block B5) and $R_{BL}$ (interposed between the output of converter 10, i.e. load $L_S$, and the measurement input M of block B5), so that:

$k_L \approx R_{AL}/R_{BL}$, in the approximation wherein
$R_{BL} >> R_{AL} >> R_{SHL}$.

In various embodiments, this solution is again applicable thanks to the particular topology adopted for the hysteresis control.

In various embodiments, a resistive divider may be provided which implements ratio $k_L$, and the correction may be applied to the measurement terminal M of block B5 of the exemplary embodiment of FIG. 1, while taking into due account the signs of the related voltages. In this respect it will be appreciated once again that the compensation may be small with respect to the measurement signal.

In various embodiments, said compensation mechanism may therefore be implemented by applying to the signal itself a compensation offset which is given depending on voltage $V_O$. This mechanism does not cause a significant reduction of the current signal which is used for the comparison ($R_{BL} >> R_{AL}$ with possible ratios of the order of 10000:1).

Various embodiments allow therefore to easily obtain the compensation of possible propagation delays of the signal chains present in converter 10, so as to regulate the current precisely and with reduced ripple, and irrespective of the values of input and output voltage and of the current.

It is moreover arranged that the comparing circuitry, presently exemplified by blocks B2 and B5 coupled to current sensors comprised of shunt resistors $R_{SHH}$ (high-side shunt) and $R_{SHL}$ (low-side shunt) is configured to generate said first (IN1) and said second (N2) logic signal, respectively when:
- the intensity of the current detected by first current sensor $R_{SHH}$ shows a (first) given offset (determined for example via divider $R_{AH}$, $R_{BH}$) with respect to the maximum level SPH, and
- the intensity of the current detected by second current sensor $R_{SHL}$ shows a (second) given offset (determined for example via divider $R_{AL}$, $R_{BL}$) with respect to the minimum level SPL.

The general distinction between a first offset with respect to maximum level SPH and a second given offset with respect to the minimum level SPL takes into account the fact that, as may be derived from the previously stated formulae, in various embodiments the considered offsets may be different. In various embodiments, both offsets may have the same value.

In this connection it will be moreover appreciated that such errors as to bring the rising and falling slopes of current $i_L$ to reach values $I_{SPH'}$ and $I_{SPL'}$ might ideally compensate each other in at least one operating condition of the converter, therefore without influencing the average value of the current. In any case, these errors would have a negative effect on the ripple, and such a drawback is in any case prevented with the presently considered compensating solution.

Various embodiments may take into account (irrespective of the possible error compensation, previously described) an aspect which is linked to the possible presence, in various embodiments, of the bootstrap circuit previously described with reference to FIG. 8.

In various embodiments, the related circuit topology may be used in order to obtain a supply voltage for the driver circuit (block B4) of switch (mosfet) M.

Figure 13:
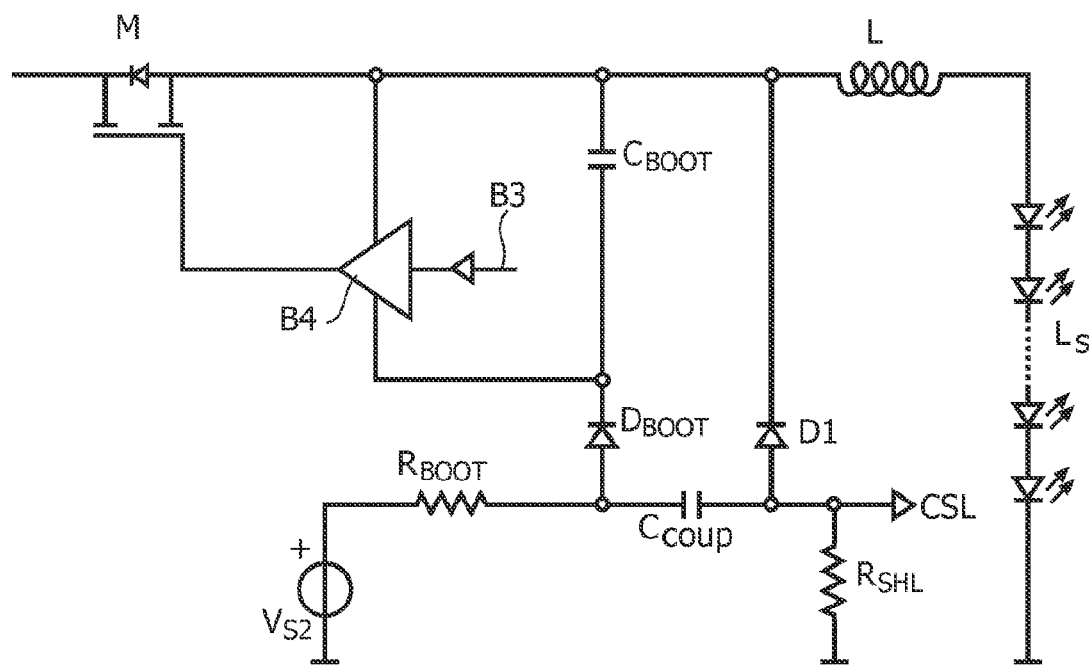
FIG. 13 shows a modification of FIG. 8 according to an embodiment.

The diagram related to the new proposed technology is shown in FIG. 13, wherein the presence of low-side shunt resistor $R_{SHL}$ is shown. From a simple analysis of such a diagram, it can be understood that the charge in $C_{BOOT}$ is restored during the freewheeling (recirculating) stage of the current flowing through inductor L: actually this very current, closing through load $L_S$, diode $D_{BOOT}$ and generator $V_{S2}$, recharges $C_{BOOT}$ so that the latter may supply current to driver B4 for the next "on" stage of the mosfet.

Therefore, in the circuit of FIG. 8, once mosfet M is open (beginning of the freewheeling stage), the current in inductor L initially circulates again in $C_{BOOT}$, until the voltage thereof is equal to the voltage of $V_{S2}$: only at this point does the current start flowing through diode D1 and therefore through shunt resistor $R_{SHL}$.

In various embodiments, this event may be incompatible with the correct operation of block B5, which (irrespective of the presence of offset divider $R_{AL}$, $R_{BL}$) senses a distorted value of the current in the beginning stage of freewheeling, and which therefore risks to drive switch (mosfet) M too early, because it detects a lower current value on shunt resistor $R_{SHL}$.

In order to overcome this possible drawback, which may occur in some embodiments, in various embodiments it is possible to resort to the diagram exemplified in FIG. 13, by providing:

- a capacitor $C_{COUP}$ interposed between diodes $D_{BOOT}$ and D1, for example, with reference to the presently exemplified biasing, between the anodes thereof;
- a resistor $R_{BOOT}$, interposed between source $V_{S2}$ and diode $D_{BOOT}$ (more specifically, with reference to the exemplified biasing, the anode thereof).

In various embodiments, the exemplified elements allow the bootstrap pulsed current to circulate through measurement shunt resistor $R_{SHL}$ as well, so as to ensure the correct operation of comparator 35.

In various embodiments, the relation $R_{BOOT} \gg R_{SHL}$ e $C_{COUP} \gg C_{BOOT}$ may apply.

The operation of the diagram exemplified in FIG. 13 is as follows: when diode $D_{BOOT}$ is shut off, capacitor $C_{COUP}$ is charged to the voltage of $V_{S2}$ via resistor $R_{BOOT}$ (therefore with a certain time constant equalling the product $R_{BOOT}C_{COUP}$).

As soon as the freewheeling stage starts, diode $D_{BOOT}$ becomes conductive, and transfers part of the charge of $C_{COUP}$ to $C_{BOOT}$, until voltages are balanced. The current allowing $C_{BOOT}$ to be recharged now traverses $R_{SHL}$, and only minimally $V_{S2}$, enabling block B5 to correctly interpret the threshold value.

Of course, without prejudice to the underlying principle of the disclosure, the details and the embodiments may vary, even appreciably, with respect to what has been described by way of example only, without departing from the scope of the disclosure as defined by the annexed claims. In this regard, the present description contains examples of embodiments wherein there are provided:

i) means (compensation dividers $R_{AH}$, $R_{BH}$; $R_{AL}$, $R_{BL}$ in FIG. 1) to prevent, in some embodiments, possible signal propagation delays to affect the possibility of regulating current precisely and with reduced ripple, irrespective of the values of input and output voltages and of the current; as well as ii) means (bootstrap circuit in FIG. 13) to prevent, in some embodiments, the alteration of the beginning stage of freewheeling (corresponding to the opening time of the main switch), which affects in the same way the possibility of regulating current precisely and with reduced ripple.

Therefore, it will be appreciated that both means denoted by i) and ii) must not necessarily coexist in one and the same embodiment.

In addition, always by way of example, in various embodiments diode D1 may be substituted, in its function of "automatic" switch which, while switch M is switched off, lets resistor $R_{SHL}$ be traversed by the current flowing via said inductor L, with a second driven switch, specifically according to criteria which complement those adopted for main switch M. All this takes place on the basis of criteria known in themselves (so-called synchronous rectification).

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A converter for feeding a load via an inductor with a current having a controlled intensity between a maximum level and a minimum level, the converter comprising:
  a switch switcheable on and off to permit or prevent, respectively, feeding of current towards said inductor,
  a current sensor including a resistor coupled to the converter output and sensitive to the current flowing through said inductor when said switch is off,
  a further switch interposed between said switch and said resistor; said further switch being conductive when said switch is turned off, whereby, with said switch turned off, said resistor coupled to the converter output is traversed by current flowing through said inductor, and
  drive circuitry of said switch coupled to said current sensor to turn said switch on as a function if the current detected by said current sensor,
  wherein a bootstrap circuit is provided for feeding said drive circuitry, said bootstrap circuit comprising:
  a bootstrap capacitor to accumulate a feeding charge for said drive circuitry, wherein said bootstrap capacitor is coupled to the converter output and a bootstrap diode,
  a coupling capacitor interposed between said further switch and said bootstrap diode;
  a bootstrap resistor interposed between a power supply source and said bootstrap diode to charge said coupling capacitor from said power supply source, whereby, with said switch turned off, said bootstrap diode transfers charge from said coupling capacitor to said bootstrap capacitor and said resistor coupled to the converter output is traversed by the current flowing through said inductor.

2. The converter of claim 1, wherein the following relationship applies for the resistance value of said bootstrap resistor ($R_{BOOT}$) and said resistor ($R_{SHL}$) coupled to the converter output: $R_{BOOT} \gg R_{SHL}$.

3. The converter of claim 1, wherein the following relationship applies for the capacitance values of said coupling capacitor ($C_{COUP}$) and said bootstrap capacitor ($C_{BOOT}$): $C_{COUP} \gg C_{BOOT}$.

4. The converter of claim 1, wherein said further switch conductive when said switch is turned off is a diode.

5. The converter of claim 4, wherein said coupling capacitor is interposed between the anodes of said bootstrap diode and said diode constituting said further switch conductive when said switch is turned off.

6. The converter of claim 1, further comprising:
  a first current sensor sensitive to the current flowing through said switch when said switch is on, said current sensor including a resistor coupled to the converter output as a second current sensor sensitive to the current flowing through said inductor when said switch is off, and wherein:

said drive circuitry is configured to turn said switch off and on upon receiving a first and a second logic signal, respectively, and comparison circuitry is provided coupled to said first and second current sensors to generate first and second logic signals when, respectively:

the current intensity detected by said first current sensor is offset of a given amount with respect to said maximum level, and the current intensity detected by said second current sensor is offset of a given amount with respect to said minimum level.

7. The converter of claim 6, wherein said comparison circuitry includes respective level comparators coupled to said first and second current sensors and configured to identify a respective given amount of offset being established between the intensity of the current detected by the current sensor coupled therewith with respect to said maximum level and said minimum level, respectively.

8. The converter of claim 6, wherein said comparison circuitry includes respective level comparators coupled to said first and second current sensors via signal dividers to apply a compensation offset to the current intensity value detected by said first and second current sensors.

9. The converter of claim 8, wherein said comparison circuitry includes level comparators that receive:

on a first input, a signal representative of said maximum level, respectively, of said minimum level, and on a second input, a signal representative of the current intensity value detected by said first current sensor, respectively, by said second current sensor having a compensation offset applied thereto by a respective signal divider.

10. The converter of claim 6, wherein said comparison circuitry coupled to said first and second current sensors is configured to generate said first and said second logic signals when, respectively:

the current intensity detected by said first current sensor is offset of a given amount and is at a lower level with respect to said maximum level, and the current intensity detected by said second current sensor is offset of a given amount and is at a higher level with respect to said minimum level.

11. The converter of claim 1, wherein said switch is an electronic switch, such as a mosfet.

12. Use of a converter to drive a load in the form of a light source, such as a LED light source, the converter comprising:

a switch switcheable on and off to permit or prevent, respectively, feeding of current towards said inductor, a current sensor including a resistor coupled to the converter output and sensitive to the current flowing through said inductor when said switch is off, a further switch interposed between said switch and said resistor; said further switch being conductive when said switch is turned off, whereby, with said switch turned off, said resistor coupled to the converter output is traversed by current flowing through said inductor, and drive circuitry of said switch coupled to said current sensor to turn said switch on as a function if the current detected by said current sensor, wherein a bootstrap circuit is provided for feeding said drive circuitry, said bootstrap circuit comprising;

a bootstrap capacitor to accumulate a feeding charge for said drive circuitry, wherein said bootstrap capacitor is coupled to the converter output and a bootstrap diode, a coupling capacitor interposed between said further switch and said bootstrap diode;

a bootstrap resistor interposed between a power supply source and said bootstrap diode to charge said coupling capacitor from said power supply source, whereby, with said switch turned off, said bootstrap diode transfers charge from said coupling capacitor to said bootstrap capacitor and said resistor coupled to the converter output is traversed by the current flowing through said inductor.

* * * * *

UNITED STATES PATENT AND TRADEMARK OFFICE
CERTIFICATE OF CORRECTION

PATENT NO. : 9,099,920 B2     Page 1 of 1
APPLICATION NO. : 14/367946
DATED : August 4, 2015
INVENTOR(S) : Angelin et al.

It is certified that error appears in the above-identified patent and that said Letters Patent is hereby corrected as shown below:

In the specification

Column 5, line 9: delete "1N2" between "signal" and "for" and insert --IN2-- in place thereof.

Column 5, line 49: delete "1N2" between "and" and "supplied" and insert --IN2-- in place thereof.

Column 7, line 64-65: insert --$i_L$-- between "current" and "having".

Column 8, line 31: delete "$I_{SPM}$" between "wherein" and "is" and insert --$I_{SPH}$-- in place thereof.

Column 11, line 20: insert --,-- between "$C_{COUP}$" and "imposed".

Column 11, line 29: delete "35" after "comparator" and insert --B5-- in place thereof.

Signed and Sealed this
Nineteenth Day of January, 2016

Michelle K. Lee
*Director of the United States Patent and Trademark Office*